United States Patent
Bathina et al.

(10) Patent No.: US 11,475,334 B1
(45) Date of Patent: Oct. 18, 2022

(54) SYSTEM AND METHOD FOR EVENT PREDICTION USING ONLINE SOCIAL MEDIA

(71) Applicant: HRL Laboratories, LLC, Malibu, CA (US)

(72) Inventors: Krishna Bathina, Bloomington, IN (US); Aruna Jammalamadaka, Agoura Hills, CA (US); Jiejun Xu, Chino, CA (US); Tsai-Ching Lu, Thousand Oaks, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 1122 days.

(21) Appl. No.: 15/847,866

(22) Filed: Dec. 19, 2017

Related U.S. Application Data

(60) Provisional application No. 62/437,658, filed on Dec. 21, 2016.

(51) Int. Cl.
    *G06N 5/04*      (2006.01)
    *G06N 7/00*      (2006.01)

(52) U.S. Cl.
    CPC ............. *G06N 5/043* (2013.01); *G06N 7/005* (2013.01)

(58) Field of Classification Search
    CPC ............................... G06N 5/043; G06N 7/005
    See application file for complete search history.

(56) References Cited

U.S. PATENT DOCUMENTS

2016/0359993 A1* 12/2016 Hendrickson ........... H04L 51/32

OTHER PUBLICATIONS

Weng, Lilian, et al. "Competition among memes in a world with limited attention." Scientific reports 2.1 (2012): 1-9. (Year: 2012).*

Korolov, Rostyslav, et al. "On predicting social unrest using social media." 2016 IEEE/ACM international conference on advances in social networks analysis and mining (ASONAM). IEEE, 2016. (Year: 2016).*

Parunak, H. Van Dyke, et al. "Dynamically tracking the real world in an agent-based model." International Workshop on Multi-Agent Systems and Agent-Based Simulation. Springer, Berlin, Heidelberg, 2013. (Year: 2013).*

(Continued)

*Primary Examiner* — Kevin W Figueroa
(74) *Attorney, Agent, or Firm* — Tope-Mckay & Associates

(57) ABSTRACT

Described is a system for large-scale event prediction and a corresponding response. The system, using an agent-based model, predicts how many users (agent accounts) on a social media platform will become activists related to a large-scale event. This process is accomplished using both Before and During models. Before the large-scale event, the system operates to generate agent attributes and a posting network based on posts on the social media platform. During the large-scale event and based on the agent attributes and posting network, the system determines if a social media user (agent account) will become an activist of the large-scale event and a corresponding magnitude of the large-scale event. Depending on the magnitude, the system can implement a responsive measure and control a device based on the prediction of the activists.

21 Claims, 14 Drawing Sheets

| | Meme-Centric | | | | User-Centric | | | |
|---|---|---|---|---|---|---|---|---|
| | Popularity | | Time | | Attention | | Entropy | |
| | $\Delta \tilde{x}$ | Z | $\Delta \tilde{x}$ | Z | $\Delta \tilde{x}$ | Z | $\Delta \tilde{x}$ | Z |
| A. Non-protesters during vs protesters during | -0.19 0.10 | 0.02 | 0.07 | | -12.79 0.31 | 0.28 | -2.14 | |
| B. Protesters before vs protesters during | -0.05 0.89 | 0.03 | -0.03 | | -10.65 0.02 | 0.01 | -1.63 | |
| C. Non-protest memes during vs protest memes during | 2.35 0.89 | 0.78 | 0.52 | | | | | |
| D. Non-protest memes before vs protest memes during | 12.95 0.89 | 0.82 | 0.47 | | | | | |

(56) References Cited

OTHER PUBLICATIONS

Bonabeau, E. (2002), Agent-based modeling: Methods and techniques for simulating human systems. Proceedings of the National Academy of Sciences 99(suppl 3): pp. 7280-7287.

Bruch, E., and Atwell, J. (2013), "Agent-based models in empirical social research," Sociological Methods & Research, 2015, vol. 44(2), pp. 186-221.

Gilbert, N., and Tema, P. (2000), How to build and use agent-based models in social science. Mind & Society 1(1): pp. 57-72.

Weng, L.; Flammini, A.; Vespignani, A.; and Menczer, F. (2012), Competition among memes in a world with limited attention. Scientific reports 2, pp. 1-9.

Jules, B.: Hashtags of ferguson (2014), https://medium.com/on-archivy/ hashtags-of-ferguson-8f52a0aced87. vbia14pwu, pp. 1-2, downloaded Dec. 27, 2017.

Boyd, D.: Streams of content, limited attention: The flow of information through social media. Educause Review 45(5), pp. 26-36 (2010).

Hodas, N.O.: How limited visibility and divided attention constrain social conta-gion. In: In SocialCom. Citeseer (2012). pp. 249-257.

Chung, F., Lu, L.: The average distances in random graphs with given expected degrees. Proceedings of the National Academy of Sciences 99(25), pp. 15879-15882 (2002).

Ferguson unrest (2016), https://en.wikipedia.org/wiki/Ferguson_unrest, pp. 1-34, downloaded Dec. 27, 2017.

Augenbraun, E.: Occupy wall street and the limits of spontaneous street protest (2011), https://www.theguardian.com/commentisfree/cifamerica/2011/sep/ 29/occupy-wall-street-protest , pp. 1-3, downloaded Dec. 27, 2017.

Bohorquez, J.C., Gourley, S., Dixon, A.R., Spagat, M., Johnson, N.F.: Common ecology quantifies human insurgency. Nature 462(7275), pp. 911-914 (2009).

Bonabeau, E.: Agent-based modeling: Methods and techniques for simulating hu-man systems. Proceedings of the National Academy of Sciences 99(suppl 3), pp. 7280-7287 (2002).

Chang, Y., Tang, L., Inagaki, Y., Liu, Y.: What is tumblr: A statistical overview and comparison. ACM SIGKDD Explorations Newsletter 16(1), pp. 21-29 (2014).

Doren, J.: Ferguson tweets, hashtags spike as anger rises (2014), http://www.usatoday.com/wlna/news/nation-now/2014/11/26/twitter-ferguson-blacklivesmatter/70132602/, pp. 1-2, downloaded Dec. 27, 2017.

Moussaid, M., Helbing, D., Theraulaz, G.: An individual-based model of collective attention. arXiv preprint arXiv:0909.2757 (2009), pp. 1-8.

Papic, M., Noonan, S.: Social media as a tool for protest. Stratfor Global Intelli-gence 3 (2011), pp. 1-9, downloaded Dec. 20, 2017.

Shirky, C.: The political power of social media: Technology, the public sphere, and political change. Foreign affairs, pp. 28-41 (2011).

Taibi, C.: Fox news panel slams bringbackourgirls hashtag activism (2014), downloaded Dec. 27, 2017.

Valenzuela, S.: Unpacking the use of social media for protest behavior the roles of information, opinion expression, and activism. American Behavioral Scientist 57(7), pp. 920-942 (2013).

Wu, F., Huberman, B.A.: Novelty and collective attention. Proceedings of the National Academy of Sciences 104(45), pp. 17599-17601 (2007).

\* cited by examiner

| | Meme-Centric | | | | User-Centric | | | |
| --- | --- | --- | --- | --- | --- | --- | --- | --- |
| | Popularity | | Time | | Attention | | Entropy | |
| | $\Delta\tilde{x}$ | $z$ | $\Delta\tilde{x}$ | $z$ | $\Delta\tilde{x}$ | $z$ | $\Delta\tilde{x}$ | $z$ |
| A. Non-protesters during vs protesters during | -0.19 | 0.02 0.10 | 0.07 | | -12.79 0.31 | 0.28 | -2.14 | |
| B. Protesters before vs protesters during | -0.05 | 0.03 0.89 | -0.03 | | -10.65 0.02 | 0.01 | -1.63 | |
| C. Non-protest memes during vs protest memes during | 2.35 | 0.78 0.89 | 0.52 | | | | | |
| D. Non-protest memes before vs protest memes during | 12.95 | 0.82 0.89 | 0.47 | | | | | |

FIG. 5A

| Parameter | Value | Significance |
|---|---|---|
| Memory Size | 10 | Measure of attention span |
| $Pn$ (Before) | 0.2657 | Novel meme probability |
| $Pr$ (Before) | $\frac{2.624}{10}$ | Re-blog probability |
| $Pn$ (During) | 0.3097 | Novel meme probability |
| $Pm$ (During) | 0.6 | Prop. of protest memes in memory to become an "activist" |
| $Prp$ (During) | $\frac{3.145}{10}$ | Protest meme re-blog probability |
| $Pm$ (During) | $\frac{2.622}{10}$ | Non-protest meme re-blog probability |

FIG. 5B ferguson, mikebrown, michaelbrown, tcot, justiceformikebrown, handsupdontshoot, mediablackout, darrenwilson, dontshoot, fergusonshooting, opferguson, policestate, missouri, ripmikebrown, handsup, police, iftheygunnedmedown, fergusonriot, prayforferguson, stlouis, standwithferguson, blacklivesmatter, nojusticenopeace, peaceinferguson, fergusonpd, whereisjustice, occupyferguson, ccot, arrestdarrenwilson, officergofuckyourself, curfew, crimebutnotime, fergusonpolice, fergusononfireusa, michael, brown, humanrightsferguson, michealbrown, mikebrownfuneral, blackyouthmatter, fergusonsolidarity, militarizationofpolice, justiceformichael, justiceformichaelbrown, mikebrownrally, militarizedpolice, dcferguson, stoppolicebrutality, policemilitarization, pleasedontshoot, fergusonqs, sosferguson, copwatch, resistwithferguson, mikebrownnola, furgeson, iammikebrown, fergusonscanner, protests, endpoliceterror, badgecam, fergusonriots, feedferguson, direnferguson, violenceincites, fergusonlive, freeferguson, endpolicebrutality, fergusontapes, fergusoncoverup, nojustice, fergson, standup, justiceformike

FIG. 5C

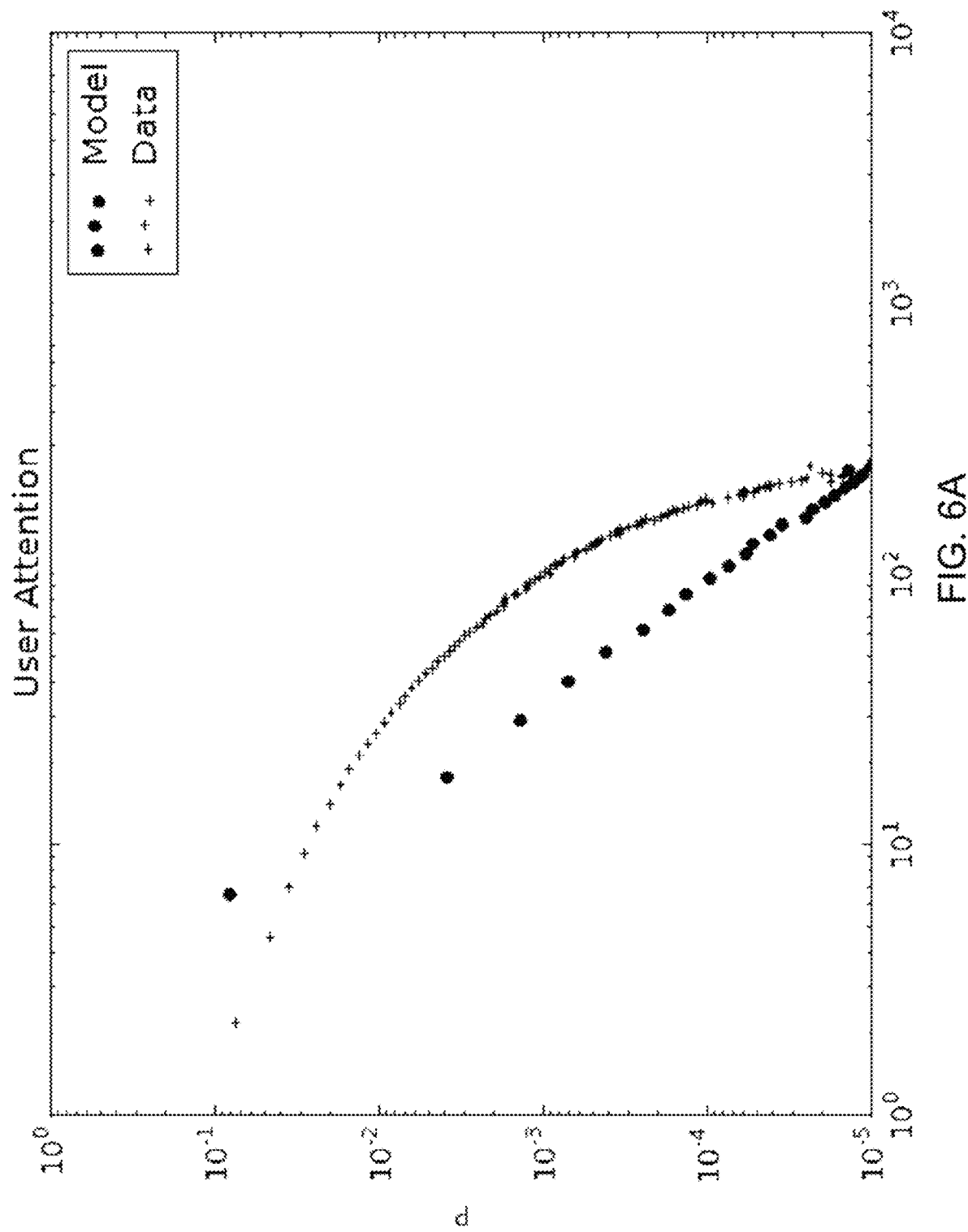

SYSTEM AND METHOD FOR EVENT PREDICTION USING ONLINE SOCIAL MEDIA

CROSS-REFERENCE TO RELATED APPLICATIONS

This application claims the benefit of and is a non-provisional patent application of U.S. Provisional Application No. 62/437,658, filed on Dec. 21, 2016, the entirety of which is hereby incorporated by reference.

BACKGROUND OF INVENTION

(1) Field of Invention

The present invention relates to prediction system and, more specifically, to temporally linked agent-based model for event prediction using online social media data.

(2) Description of Related Art

Social media has provided an unfiltered platform for the masses. Online postings often provide a look into the posters actions or mindset, giving rise to a number of analysis models. For example, the work of Weng et al. focused on modeling the attention span of agents in an online social network by allowing agents to have a 'Memory' and a 'Screen' (see the List of Incorporated Literature References, Literature Reference No. 4). They then varied the lengths of the 'Memory' and the 'Screen in order to see its effect on posting behavior. Because of this, their model is not specified for any types of events but instead on online social media as a whole. More specifically, the model of Weng et al. does not account for an event with distinct time periods, such as protests or other large-scale events.

Other model systems are based on agents within the model. Typical agent based models are built to study physical systems, such as epidemiology and human mobility. Its use in online social media has been limited to lack of data and computational power. With the recent upbringing of these two, agent based models have been growing more and more popular. The Weng et al. model, for example, while very influential, was not focused on simulating events, such as protests.

Thus, a continuing need exists for a system that is operable for predicting exact events based on agents within the social media platform.

SUMMARY OF INVENTION

This disclosure provides a system for large-scale event prediction and a corresponding response. The system includes one or more processors and a memory. The memory is a non-transitory computer-readable medium having executable instructions encoded thereon, such that upon execution of the instructions, the one or more processors perform several operations. During operation, the system, using an agent-based model having a plurality of agents and associated agent accounts, predicts how many agent accounts on a social media platform will become activists related to an event, the prediction being determined based on a quantity of memes in the agent's memory that are associated with the event. The system then controls a device based on prediction of the activists related to the event.

In another aspect, predicting how many agent accounts on a social media platform will become activists further comprises operations of generating, based on posts on the social media platform before the event, agent attributes and a posting network; and determining, during the event and based on the agent attributes and posting network, if a social media agent account will become an activist of the event.

Additionally, agents within the posting network having memories and neighbors. Further, generating agent attributes and a posting network further comprises operations of loading random memes into agents' memories, the agents being within a re-blog network from the social media platform; selecting an agent from the re-blog network to post with a probability proportional to the agent's out-degree within the re-blog network; determining if the agent posts a novel meme with a probability Pn or a set of memes from the agent's memory, such that if the agent is posting a novel meme, the novel meme is added to the agent's memory and if the agent is posting from the agent's memory, each meme in the agent's memory is added to the post with probability Pr; and after every post, updating the agent's memory and memories of the agent's neighbors with the posted memes, thereby generating the agent attributes and corresponding posting network.

In another aspect, determining if a social media agent account will become an activist of the event further comprises operations of randomly selecting a number of agents from the posting network; adding to the agents' memories memes associated with the large-scale event with frequencies proportional to the observed counts on a first day of the event; selecting an agent from the posting network with a probability proportional to the agent's out-degree within the posting network; determining if the agent posts a meme from memory based on the probability Pn being less than a randomly selected number; and if the agent is posting from the agent's memory, designating the agent as an activist if a percentage of memes in the agent's memory associated with the event is greater than a predetermined proportion of event memes in the agent's memory Pm.

In yet another aspect, the system performs an operation of estimating a magnitude of the event. The device is activated when the magnitude exceeds a predetermined threshold.

In another aspect, controlling the device includes causing relevant data to be transmitted to an interested party.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5A is a table illustrating statistical differences in posting behavior as captured by four metrics;

FIG. 5B is a table illustrating example parameters and statistical results using the system described herein;

FIG. 5C is a table illustrating example memes;

FIG. 6A is a chart illustrating a comparison of user attention from historical data and a model according to embodiments of the present invention;

DETAILED DESCRIPTION

Figure 1:
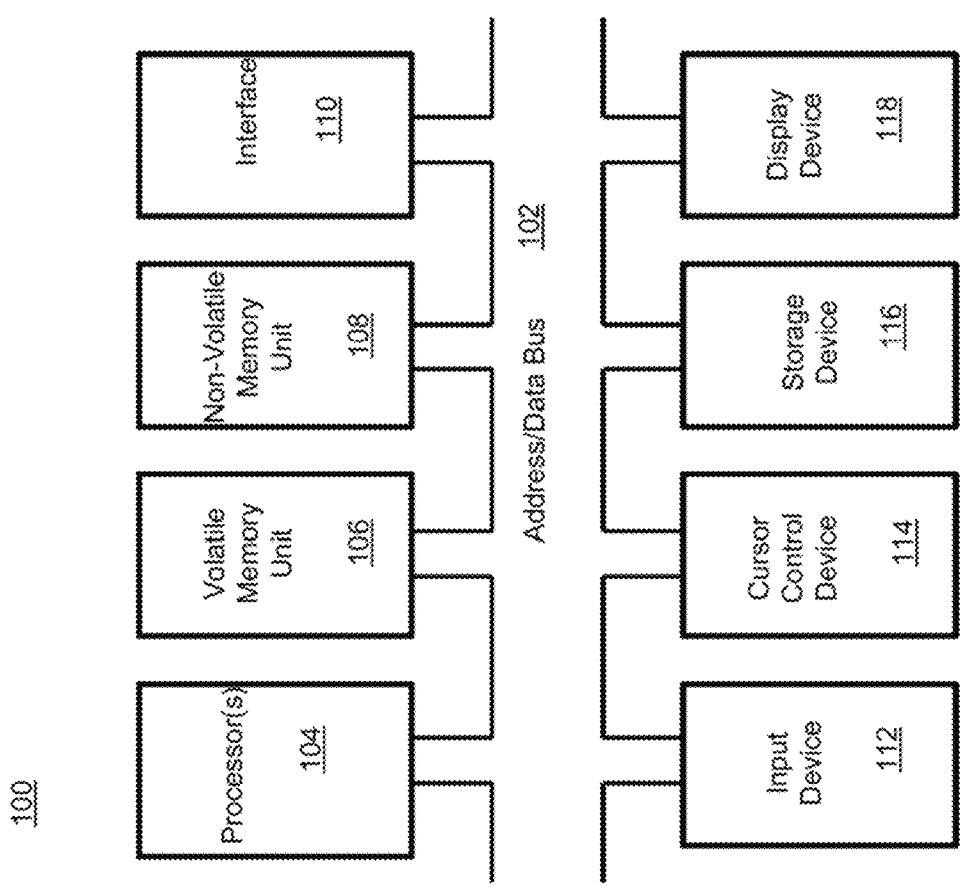
FIG. 1 is a block diagram depicting the components of a system according to various embodiments of the present invention.

The present invention relates to prediction system and, more specifically, to temporally linked agent-based model for large-scale event prediction using online social media data. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Bonabeau, E. (2002), Agent-based modeling: Methods and techniques for simulating human systems. *Proceedings of the National Academy of Sciences* 99(suppl 3):7280-7287.
2. Bruch, E., and Atwell, J. (2013), Agent-based models in empirical social research. *Sociological methods & research* 0049124113506405.
3. Gilbert, N., and Terna, P. (2000), How to build and use agent-based models in social science. *Mind & Society* 1(1):57-72.
4. Weng, L.; Flammini, A.; Vespignani, A.; and Menczer, F. (2012), Competition among memes in a world with limited attention. *Scientific reports* 2.
5. Jules, B.: Hashtags of ferguson (2014), https://medium.com/on-archivy/hashtags-of-ferguson-8f52a0aced87.vbia14pwu.
6. Boyd, D.: Streams of content, limited attention: The flow of information through social media. Educause Review 45(5), 26(2010).
7. Hodas, N. O.: How limited visibility and divided attention constrain social conta-gion. In: In SocialCom. Citeseer (2012).
8. Chung, F., Lu, L.: The average distances in random graphs with given expected degrees. Proceedings of the National Academy of Sciences 99(25), 15879-15882 (2002).

(2) Principal Aspects

Various embodiments of the invention include three "principal" aspects. The first is a system for large-scale event prediction using online social media data. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
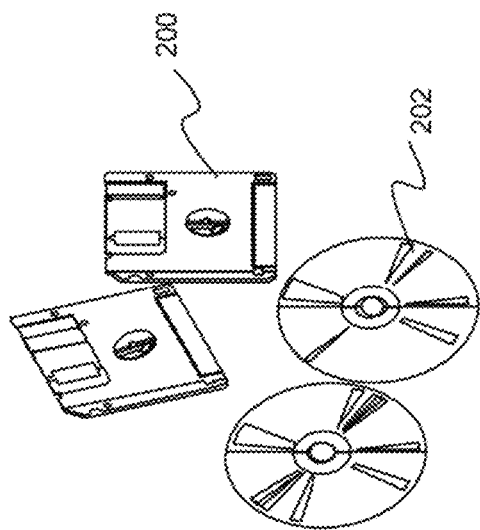
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Hashtag activism", first mentioned in reference to the Occupy Wall Street movement, has been increasingly popular during recent protests, including viral memes or hashtags such as #OccupyWallStreet, #SOSVenezuela, #HKClassBoycott, and #StopLieAboutTurkey. This is due to both increased awareness of global news events and increased use of social media platforms such as Twitter, Facebook, Instagram, and Tumblr. These factors, along with the low cost of posting, enable activists to easily further protest issues to populations that are not directly affected by the protest. While the efficacy of these protests have come into question, there is a positive correlation between social media usage and political participation, therefore the spreading behavior of these hashtags is of interest to those studying information dynamics during times of civil unrest. Agent-based models (ABMs) are computational models with autonomous agents, an environment, and mechanistic behaviors that can be used to represent and simulate emergent behavior from complex, non-linear mathematical systems. This disclosure is directed to building an ABM that accurately models social media behavior during an actual large-scale event (e.g., protest, concert, rally, tournament, etc.) by switching rules for agents during the event depending on whether or not they (and the associated agent account) become an "activist". Thus, this disclosure provides a system and method for prediction. More specifically, described is a temporally linked agent based model for large-scale event prediction using online social media.

The system and model of this disclosure predicts the posting behavior of social media users both Before and During large-scale events. Given a significant event on social media, such as a protest, the model can accurately mimic a user's decision to post either non-protest or protest memes. The model can scale to simulate millions of agents (and their associated agent accounts) and can thus accurately represent a specific portion of the population. Given a network as input, the 'Before' model first simulates normal posting behavior. The simulation results are then used as input into the 'During' model. A unique aspect of the invention is this link along with a simple behavior change in the 'During' model. The agent used a simple linear threshold in order to decide what kind of meme to post (non-protest vs. protest).

A purpose of using an agent-based model is to simulate a real system. See Literature Reference Nos. 1 through 3 for a description of agent-based models. If a basic model is validated with data, the model can be used as a proxy for the real system. The model can then be extended with new features and then analyzed for prediction purposes. The model described herein was specifically built and validated using Tumblr data about the Ferguson protests in 2014. On August 9th, Michael Brown, an African American resident of Ferguson, Mo., was shot dead by now ex-Police Officer Darren Wilson. Ferguson locals started protesting later that day and were met with officers in riot gear. The tensions escalated and included a declared state of emergency by the governor, a state mandated curfew, intervention by the National Guard and increased violence on both sides. On Sep. 3, 2014, the state of emergency was lifted. While the physical protests were local, it gained national popularity due to increasing social media coverage.

An important advantage of the present model is that the framework is more generalizable to significant events with a large social media following but still more specific and more provides more information than models that simulate general social media behavior. Also, the modular construction of the model described herein allows for many types of extensions, such as different kinds of agents, different environments, more complicated cognitive processes, and even real-world interventions. With careful feature building, the outcomes of future problems and interventions can be simulated and predicted, which is especially important for large-scale events such as protests and natural disasters. Specific details are provided below.

(4) Specific Details of Various Embodiments

The system described herein provides a temporally linked agent based model for social media and resulting action based on the predictions of the incorporated model. The model operates through information diffusion on the same network over at least two connected time periods on online social media. By modeling exact individuals in a system, the model is able to accurately portray meme diffusion. A meme is, for example, a hashtag or other suitable item which propagates on social media, such as #blacklivesmatter. For example, Hashtags such as #Ferguson, #fergusondecision, #blacklivesmatter, and #justiceformikebrown became instantly viral. An estimate from Twitter showed more than 3.5 million tweets mentioning Ferguson were published within 3 hours after the grand jury decision in the case.

Figure 3:
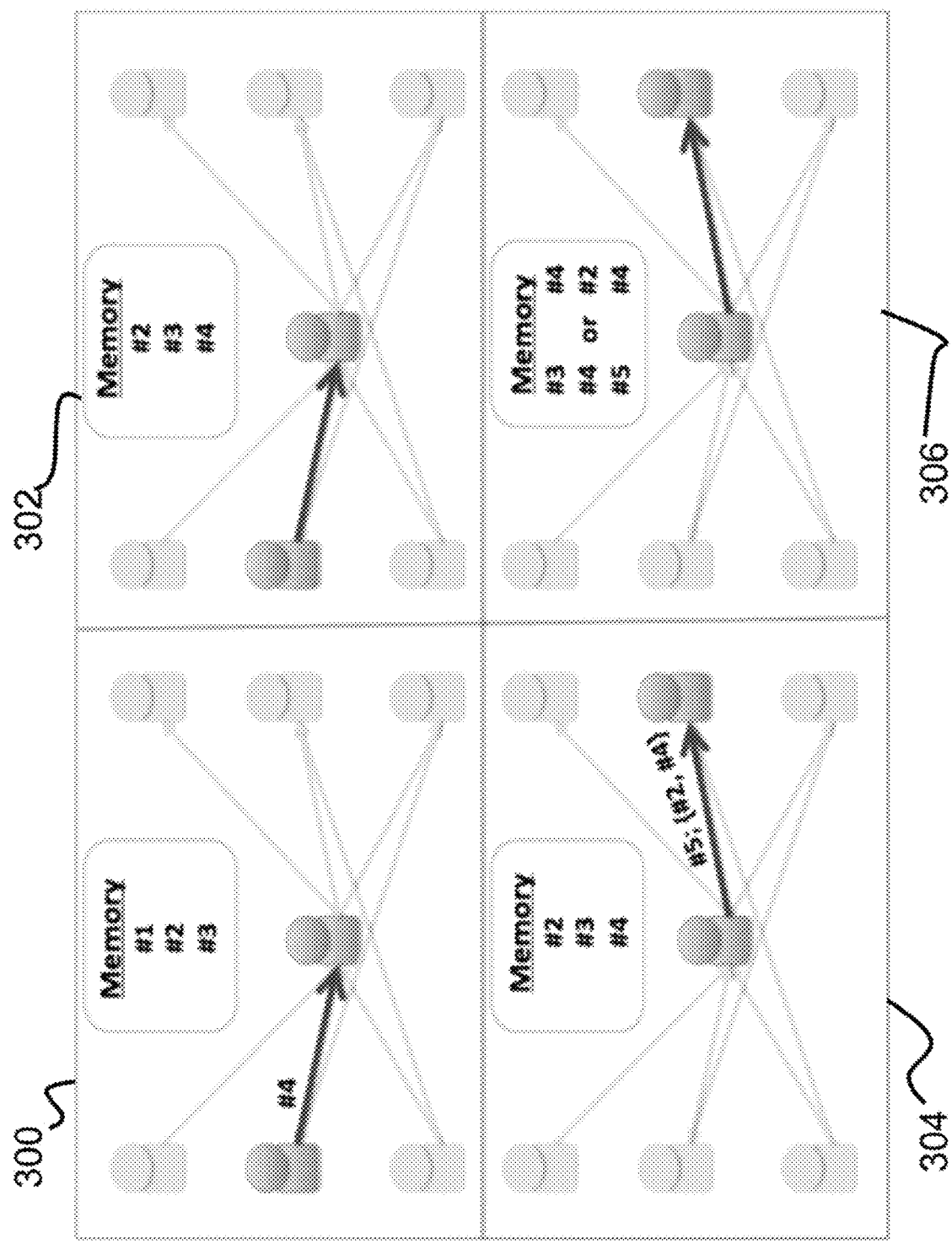
FIG. 3 is an illustration visualizing an agent-based model before an online social media protest.

An illustration depicting the process of meme diffusion before an online social media protest is provided in FIG. 3, showing an example of agent attributes and a posting network from the agent (i.e., associated agent account). The upper left box 300 depicts an agent choosing to use meme #4. In the upper right box 302, the agent in the middle receives the meme and its memory is updated so that the oldest meme is removed and #4 is added. In the lower left box 304, the agent can choose to post either a novel meme (e.g., #5), or some from memory (e.g., #2 and #4). In the bottom right box 306, similar to above, the memory of the agent is updated, either with meme #5 or with meme #2 and #4.

(4.1) Data Collection

As input into the system, a set of data needs to be collected. Social media users upload blog posts that can include text, images, and video. Such users can also unilaterally follow other users and re-blog their content. Unlike Twitter, Tumblr does not have a character limit on posts and thus is more commonly viewed as a social media for themed blogs. An example dataset was used that contained every single blog post and re-blog from 2012 to 2014. Each entry contains the original post, the memes (hashtags) used in the post, the date of the re-blog, the original source of the re-blog (root), and the direct source of the re-blog (parent). For experimental purposes, a list of memes that were in support of Ferguson were first gathered as defined by Literature Reference No. 6. The memes are shown in the table depicted in FIG. 5C.

Time periods must also be defined. In the example provided, two time periods in the dataset were defined as follows: May to August 8th as Before the protest and August 9th to September 3rd as During the protest. The Before corresponds to three months before the protest for modeling non-protest behavior and the During corresponds to the period from the killing of Michael Brown to the day the national emergency was lifted for modeling protest behavior. All users were then identified that have used any of the above protest memes at least once in the During period. Once the user population was collected, all of their posts and re-blogs were extracted from both the Before and During periods. All memes that are not in the list shown in FIG. 5C were labelled as non-protest memes. All posts and re-blogs in the same time period were also extracted from 10,000 random users that never used one of the listed protest memes as a control group, in order to first test if there is truly a statistical difference in behavior between this group and the protest-meme-using group.

Typical social media APIs only allow for a partial data collection, or implement waiting times that make the collection of a complete dataset very difficult. The public Twitter API allows 180 queries per 15 minute window, Twitter Decahose only collects 10% of the total data, and Instagram allows a maximum collection of 5000 posts per hour. The case study described in this disclosure differed in that the full dataset was obtained for the chosen period of interest, and thus the model can be accurately validated. In total, this period contained 220 million posts and 764 million memes. During the protest, about 1.7% of the posts and 2.1% of the tags were about the Ferguson protest. From this dataset, the full re-blog network was extracted and every blog and re-blog was analyzed. This network consisted of 413,867 nodes and around 23 million total edges. The full re-blog network included directed edges that represent the flow of the memes and also include the number of memes initially in the system, and several parameters.

(4.2) Metrics

In order to describe the data, four different metrics for quantifying social media behavior are used, as defined in Literature Reference No. 4. Meme-centric posting metrics include the Meme Time and the Meme Popularity. Meme Time is the longest consecutive number of days that a meme was posted in the dataset and the Meme Popularity is the average number of posts of a meme per day. Agent-centric posting metrics include the User Entropy and the User Attention. User Entropy is the average Shannon Entropy of the memes posted by a given user per day, and is given by $H(X)=\Sigma_{i=1}^{n}P(x_i)\ln(P(x_i))$, where $x_i$ represents a given meme, and n is the total number of memes posted by that user that day. User Attention is calculated as the average number of re-blog per user per day. The Meme Popularity, User Entropy, and User Attention are averaged over only days that had posts; days without any posts were ignored.

(4.3) Preliminary Analysis

In order to determine whether a change in ABM rules during the protest was needed, four different preliminary statistical analyses were performed, results of which are shown in the table of FIG. 5A. Protesters are individuals who posted at least one protest meme during the time period of the study. Non-protesters, which are only used for analysis A, were chosen by finding all users that did not use any of the protest memes, followed by randomly sampling a set of 10,000 users to prevent any bias. $\Delta\tilde{x}$ is the difference in median between both groups, or the effect size, and Z is the test statistic from a Kolmgorove-Smirnov (KS) test. The Meme Time was normalized over the total number of days, allowing the continuous assumptions of the KS test to hold. P-values are not reported because $-\log p > 30$ for each test, and thus were significant. For most comparisons, the $\Delta\tilde{x}$ were very small. Analyses C and D, on the other hand, show that the protest memes had much more Popularity than all non-protest memes. Also, Analyses A and B show that the User Attention for both non-protesters and protesters before the protest was larger than protesters during the protest. The results show that a difference exists between all compared groups, especially the Popularity of memes and the Attention of users. Further details regarding the model process are provided below.

(4.4) Model Description

The model is meant to mimic the natural posting patterns and influence of connected users during large-scale events (and during non-event periods), such as protest and non-protest periods. It should be noted that although the term "protest" is used for illustrative purposes, the invention is not intended to be limited thereto as the model can be used for any large-scale event. "Large scale event" refers to any event that causes a significant change in social media posting behavior across a significant subset of the total population. For example, the numbers for the study in this paper were 6670 protestors out of a population of 412,803 total connected users. Example events may include political events (e.g. protests, passing of legislation, elections, etc.), product releases (e.g., movies, iPhones, software, vehicles), or other events that generate discussion. This method/model can then be used to simulate how a bias will spread across the network and how many total users at the end of a given time period will have adopted that bias. For some embodiments, it is assumed that an identifiable set of keywords or hashtags that indicate a bias either in support of or against said event can be determined. There are many existing natural language processing techniques for this if a list of words are not readily available. A user's bias is also assumed to be influenced by the biases and posting behaviors of their social network connections (friends, people followed, linkedin/business connections, etc.).

The model includes social media users (e.g., Tumblr users or user accounts) as agents (and their associated agent accounts) and the full re-blog network as their environment, where directed edges represent the flow of memes. Each time step in the model represents one day. The total number of posts in the "Before" and "During" simulation periods are equal to the observed total number of posts during those periods, and an equal number of posts occur on each day of the simulation. Agents have a finite-sized Memory that contains a list of memes with repetitions. The memory is finite because it better models the limited attention that is evident among social media users (see Literature Reference Nos. 6 and 7). If new memes are added to the memory, the oldest meme is removed from the list, representing the discovery that the number of memes to which a user can pay attention is bound, and therefore the injection and survival of new memes comes at the expense of others (see Literature Reference No. 4 for a discussion of limited attention of memes). The model contains five parameters that are adapted from the work of Literature Reference No. 4. Specifically, the model of this disclosure includes the following five parameters: Pn is the probability of posting a novel meme, Pr is the probability of posting multiple memes per post before the protest, Prn is the probability of posting multiple non-protest memes during the protest, and Prp is the probability of posting multiple protest memes during the protest. Finally, Pm represents the proportion of protest memes needed in memory to post about the protest.

Figures 4A, 4B:
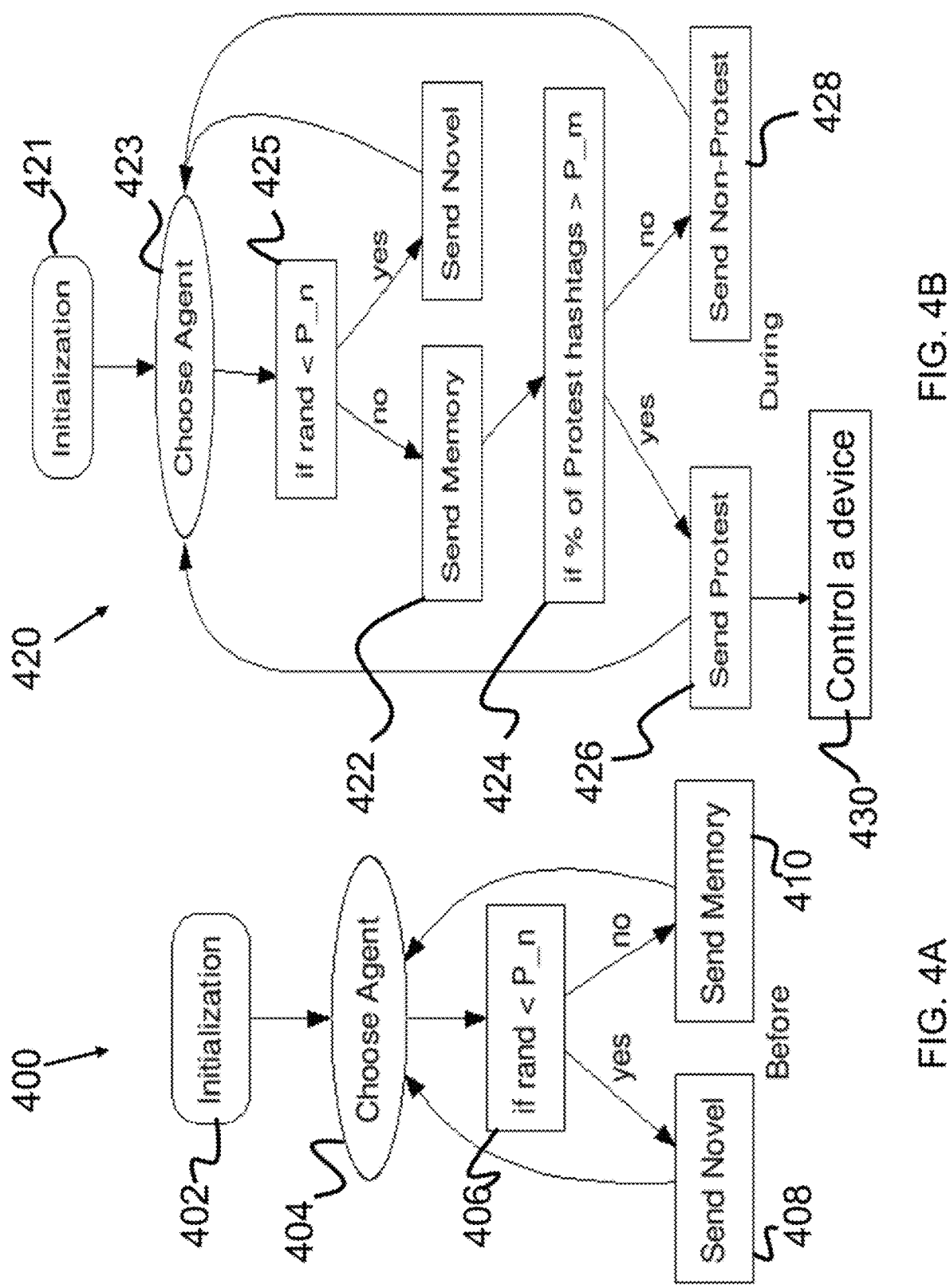
FIG. 4A is a flow chart depicting a process for protest prediction before a large-scale event.
FIG. 4B is a flow chart depicting a process for protest prediction during the large-scale event.

As shown in FIGS. 4A and 4B, the model is split into two-time periods, before 400 (see FIG. 4A) and during 420 (see FIG. 4B) the large-scale event (e.g., protest). At initialization 402, the re-blog network for the data is loaded into the Before model 400. In the example provided, the largest connected component of the original network was used, containing 412,803 nodes (e.g., agents as associated with agent accounts). The agents' memories are then loaded with random memes.

At each iteration, an agent is chosen 404 to post with a probability proportional to their out-degree, which has previously been shown to approximate true posting behavior (see Literature Reference No. 8). This agent then either 406 posts a novel meme 408 with probability Pn, or posts a set of memes from memory 410. Pn is the probability of posting a novel meme, or stated in another manner, the average number of posts with a new meme per unit time (day). The decision 406 on which type of posting is based on whether or not Pn is greater than the probability of randomly posting a novel meme. For example, the system selects a random number from the range [0,1] and if the randomly selected number is less than Pn, the agent posts a novel tag, otherwise it is sent from memory. Or stated in the alternative and as depicted, if Pn is greater than the randomly selected number, then the agent posts from memory 410, otherwise the agent posts a novel meme 408. If the agent is posting from memory 410, each meme in memory is added to the post with probability Pr. After every post, the agent's memory, along with the memories of its neighbors are updated with the posted memes and a new agent is chosen 404, thereby generating agent attributes (e.g., posted memes) and a corresponding posting network.

The flowchart used During the large-scale event is shown in FIG. 4B. The During model 420 is initialized 421 with the agent attributes and network from the end result of the Before model 400. Any suitable number of initial agents (agent accounts) are randomly chosen as participants from the posting network, and memes associated with the event (e.g., protest memes) with frequencies proportional to the observed counts on the first day, are added to their memory. As a non-limiting example, the number of participants selected is equal to the number of actual participants (e.g., protestors) on the first day of the large-scale event (e.g., protest). As was the case before, at each iteration, an agent (i.e., agent account) is chosen 423 to post with a probability proportional to their out-degree. The model 420 itself is identical to the Before model 400 until an agent chooses 422 to post from memory, which occurs when Pn is less than a randomly selected number (e.g., from [0,1] as described above). If the percentage of protest memes in their memory is greater than Pm, the agent (or agent account) has become an activist, and consequently, this agent (i.e., agent account) posts 426 only protest memes (i.e., memes associated with a large-scale event). Each protest meme is chosen with probability Prp with each post containing at least one meme. If the percentage in memory is not greater than Pm, the agents posts 428 only non-protest memes, each with probability Prn. To clarify, all agents in the example model are protesters; they become activists once more than Pm percent (e.g., 60% or any other predetermined amount) of their memory is filled with protest memes. Again, after every post, the agent's memory along with the memories of its neighbors are updated accordingly.

All macro-level model probabilities were calculated empirically from the data. Pn is calculated by finding the average number of posts with a new meme per unit time (day). The Pr parameter family is calculated by the average number of memes per post divided by the length of the agent's Memory. Pr represents the average number of memes per post before the protest, while Prp represents the average number of memes per post during the protest for posts that include protest memes and similarly, Prn is calculated by the average number of memes per post during the large-scale event for posts that do not include memes associated with the event. Pm and the size of the Memory are tunable parameters. The results of all the parameters are shown in the table of FIG. 5B.

An agent based model as illustrated in the figures is used to simulate social media posting before and during a protest. This simulation will result in a prediction of the number of activists and protestors involved in the protest online, and may then be used to estimate magnitude of the protest in the real-world. Even without a correlation to number of people physically showing up to a protest, it is useful to estimate the magnitude and social effect of this protest topic with respect to other previous protests.

(4.5) Experimental Results

The ABM metrics show that results from the Before and During model are quite similar to empirical results from observed data. This section focuses on the emergent results from the During model. These results are shown in the normalized histograms of FIGS. 6A through 6D. It is noted that FIGS. 6A through 6D provide plots illustrating a comparison between model results and observed data via normalized histograms of the defined metrics. All plots are shown on a log-log scale except for FIG. 6D (Meme Time), which is shown on a linear-log scale.

Figure 6B:
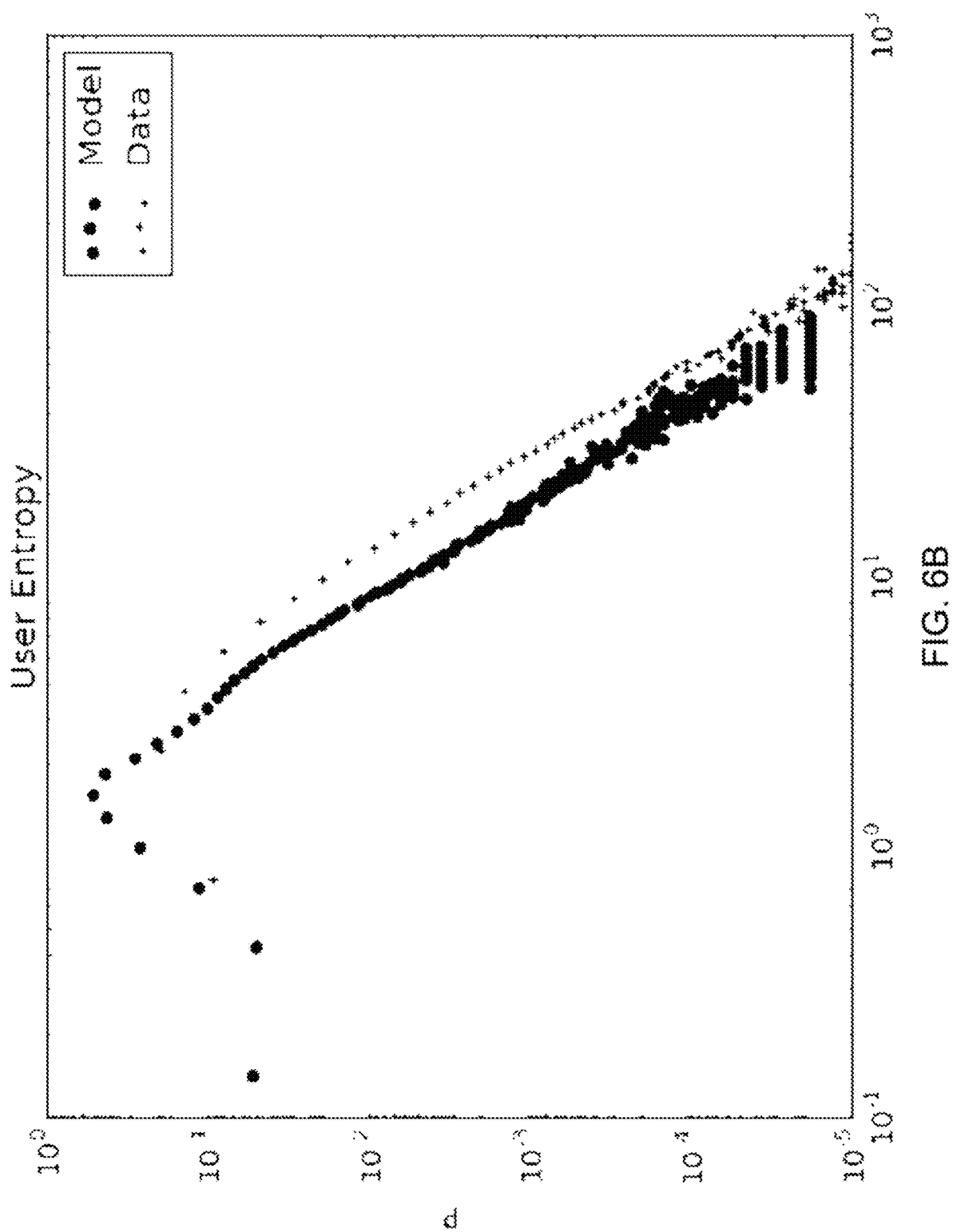
FIG. 6B is a chart illustrating a comparison of user entropy from the model and historical data.

FIG. 6A shows that the User Attention from the model did not match that from data as well as expected. The model shows a linear distribution of User Attention because of the assumption that posting is proportional to the number of out edges. However, the results indicate that the number of Tumblr users with a moderate average number of posts per day are higher than expected. Even with this mismatch, the assumption is reasonable based on previous studies, and the model can be overfit by incorporating the observed total number of posts per day. As shown in FIG. 6B, the Entropy of the model did match the data with a slight increase to a peak around 1.0, and then a rapid decrease afterwards, which suggests that most users tended to post with very little variety per day. In the model, Entropy is a factor of the rate of novel memes, protest memes, and non-protest memes. Increasing the rate of novel memes, Pn, would increase the average user entropy while increasing the rate of protest and non-protest memes would decrease the entropy.

Figure 6C:
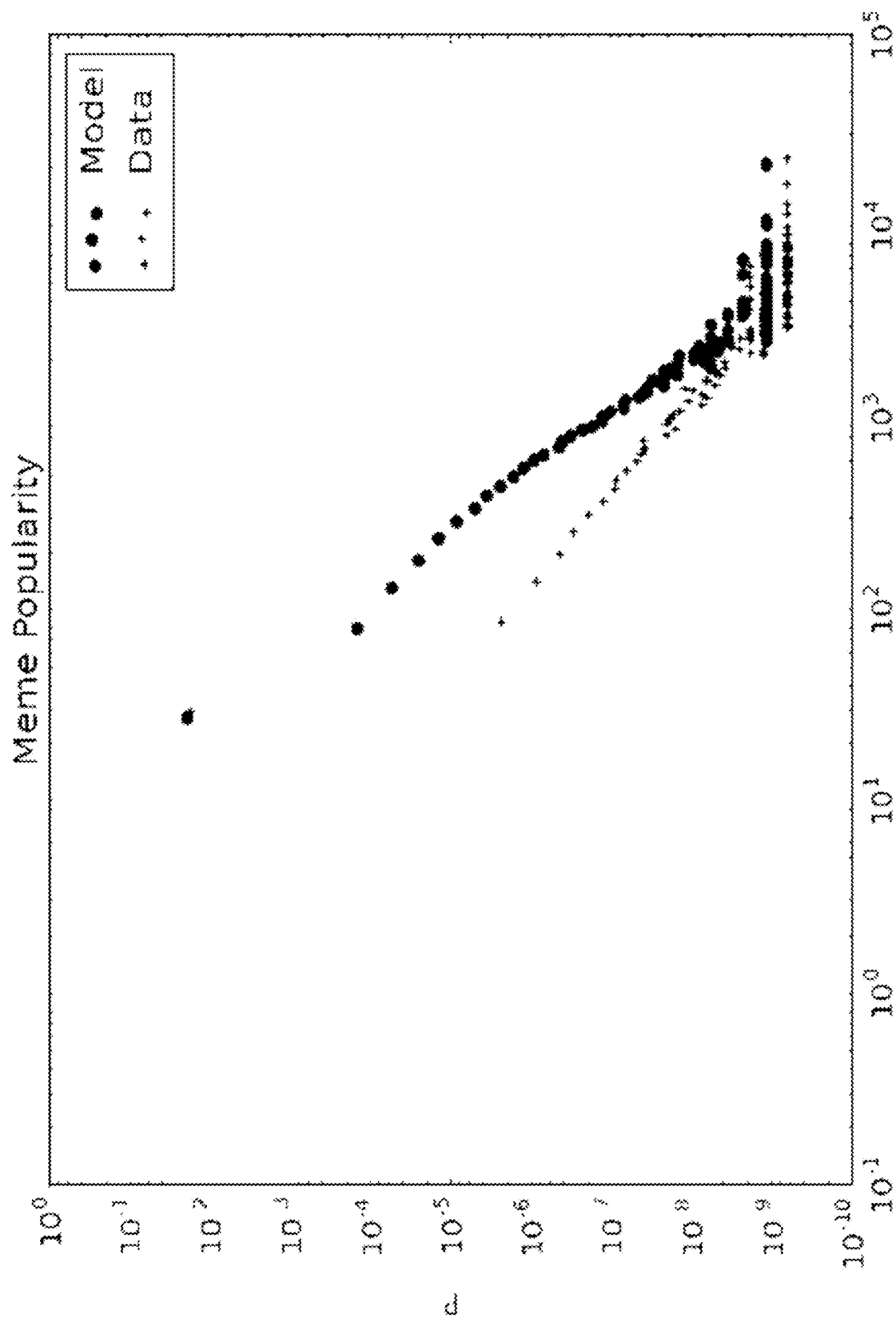
FIG. 6C is a chart illustrating a comparison of meme popularity from the model and historical data.

FIG. 6C shows that although the model and data distributions have similar shapes, the model tended to overestimate the Meme Popularity. This is most likely due to a posting behavior assumption since Meme Popularity is a function of what memes are posted, and thus, which users are posting. But, with such a low difference in probabilities and a similar distribution shape, it is submitted that the deviances are reasonable.

Figure 6D:
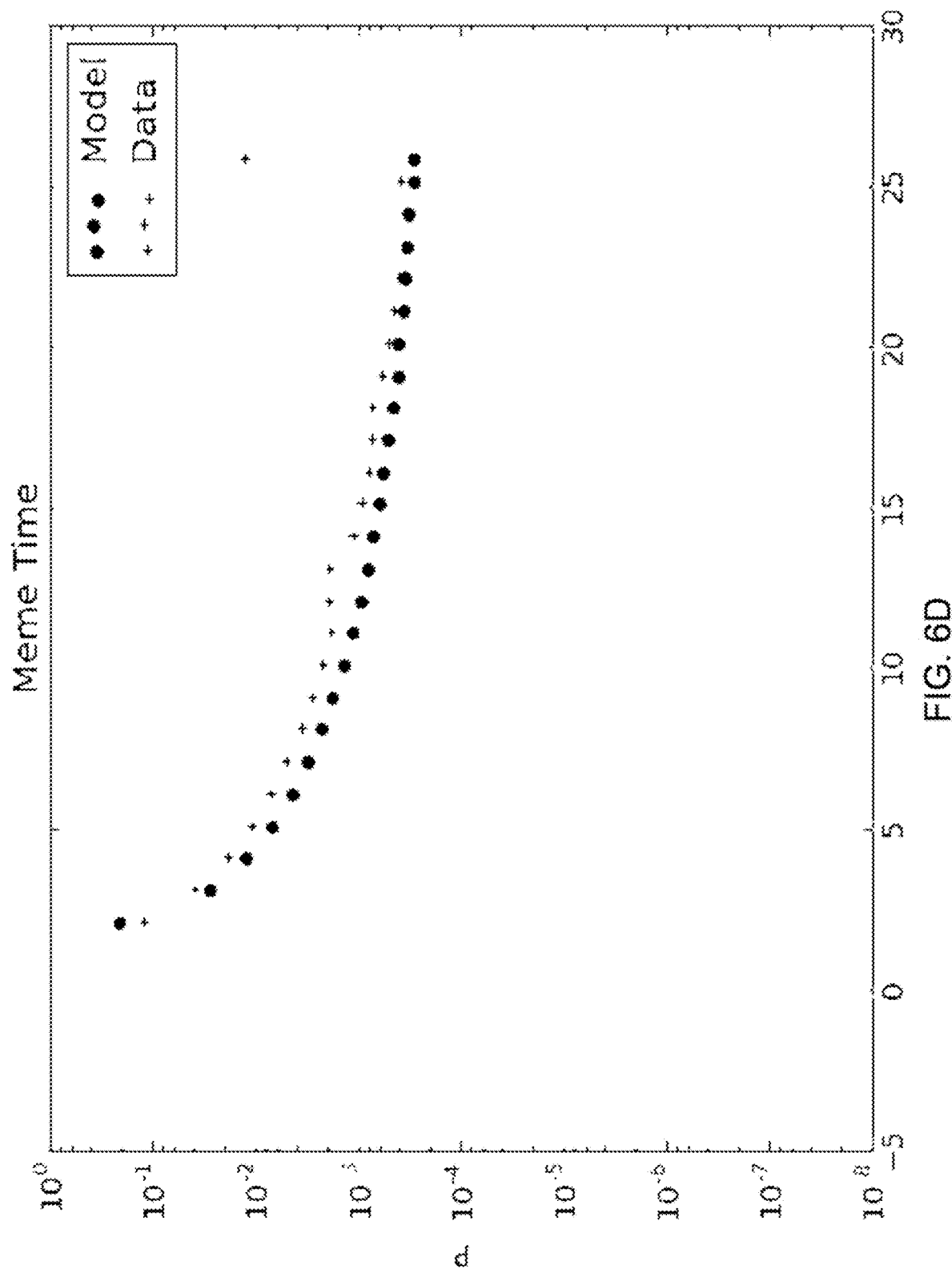
FIG. 6D is a chart illustrating a comparison of meme time from the model and historical data.

The Meme Time for the model and data in FIG. 6D show similar distributions, with both flattening out as the time increases, suggesting that the majority of Tumblr memes are not re-blogged. Meme Time is a function of the re-blog parameters, Pr, Prp, Prn; increasing their values would cause an increase in the lifetime of the meme.

The results from the During model in FIGS. 6A through 6D may look very similar to the data simply due to a large proportion of non-protest memes. Therefore, to capture the true effect of the model, unnormalized histograms are shown for only the protest memes in FIGS. 7A and 7B using both the During model and the observed data. The plots are on a linear-log scale and use unnormalized histograms to highlight the magnitude of protest memes.

Figure 7A:
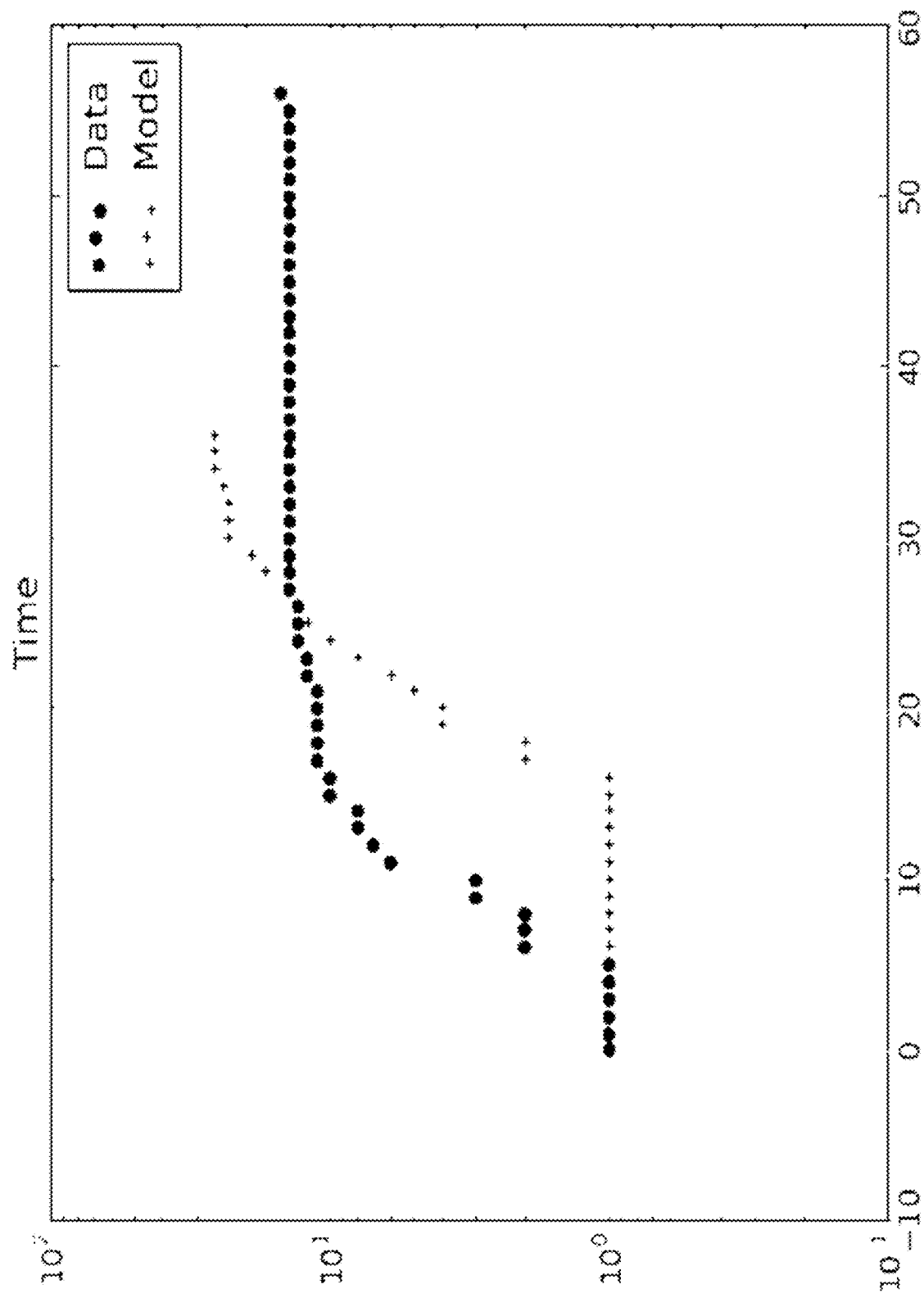
FIG. 7A is a chart illustrating a comparison of meme time from the model and historical data.
Figure 7B:
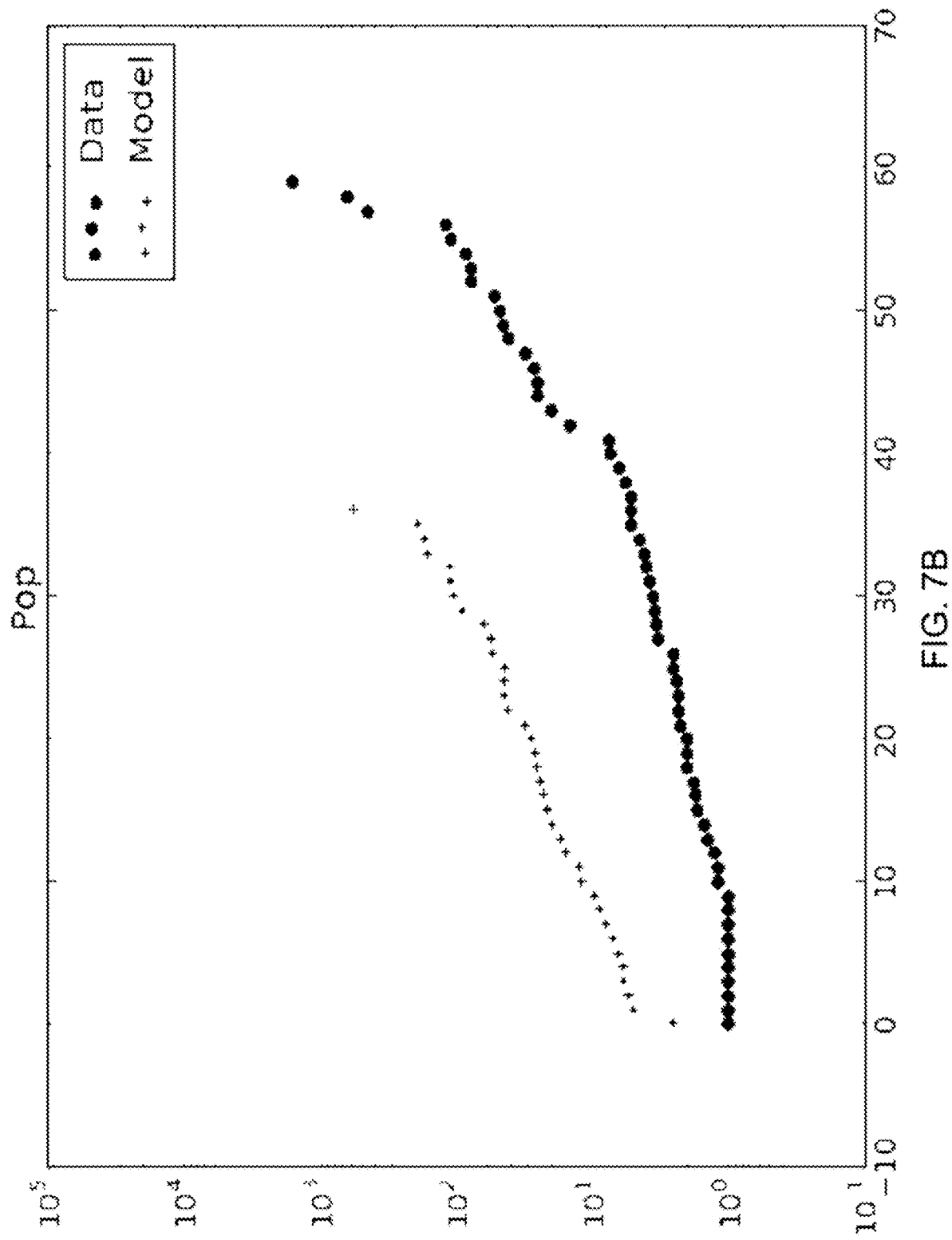
FIG. 7B is a chart illustrating a comparison of meme popularity from the model and historical data.

FIG. 7A shows a very similar behavior between Meme Times in the "During" model and the data, with the model tending to slightly underestimate the times. Similarly, the Meme Popularity in FIG. 7B shows that the shape of the model results and data distributions match well, but the model tends to overestimate the popularity by about a factor of 10. Overall, the difference in model and empirical results are small, therefore it is shown that the model successfully and accurately describes the full Tumblr dataset.

The results from the Ferguson dataset validate the agent based model to simulate information diffusion over the same network among many connected time periods. There are many uses for this kind of model. As in the example above, the model can be used to measure the virality of certain memes during protests, natural disasters, or other major events. This information can be used as a proxy for human behavior. The model can also give further information about the efficacy of how and how often to introduce new memes. Various strategies such as flooding the network or small controlled injections of memes can be studied. These issues are especially important for advertising and emergency responses with the goal of capturing the attention of as many users as possible.

There are many straightforward extensions of this model that would enable its use in more complex scenarios. For example, one could model the compound, possibly cascading, effects of several consecutive real-world protest events, such as the ongoing protests in Venezuela. An alternate extension involves allowing more than just two types of agents (i.e. activist or non-activist). For example, a class of neutral agents could represent non-protesters and be added to the network. These non-protesting agents interact with the protesting agents and influence the spread of non-protest memes. This flexibility, specifically the ease of implementing heterogeneous agents with diverse rule sets is one of the many strengths of ABMs. However, the more complex the model becomes, the more computationally costly it is as well, therefore this added realism may require a trade-off such as using a randomly sampled subset of the entire network.

Another natural extension is the use of multiple sources of information. The model can include multiple networks of different online social media outlets and will more realistically predict the flow of memes. The problem with these kinds of models is that data across multiple sources is difficult to gather, thus validating the model is also difficult. By validating the model of this disclosure on the full Tumblr dataset, it was shown how accurately posting behaviors are captured. This agent-based model can be used by researchers to study information diffusion and the feedback effects between physical events and online social media networks. As can be appreciated by those skilled in the art, there are also a number of other uses of the system described herein.

(4.6) Example Implementations

The system described herein can be implemented in a variety of systems. For example, it can be used in many other relevant research projects, such as posting behavior across multiple social media outlets to coordinate attacks against the spreading of certain memes. In other aspects and as described in further detail below, a device can be controlled (e.g., activated) if a magnitude of the large-scale event exceeds a predetermined threshold. For example, the system can be used to find effective approaches to advertising on social media. It can be extended to include and model many new features such as bots that can continuously post advertisements as well as coordinated injections of advertisements with internet weblinks into the social network. By studying the outcomes of the model with these extensions, commercial companies can more optimally advertise their products and services on social media. As a non-limiting example and referring again to FIG. 4B, if the system predicts an upcoming large-scale event (e.g., a protest or concert), advertisements related to the large-scale event (e.g., such as discounted travel fare to the event, local event tickets, nearby lodging within a distance threshold, etc.) can be automatically posted (by a controlled device 430, such as a server) to the users on the social media platform with links to the relevant websites where users can purchase the related product or service. In another aspect, the prediction of the large-scale event is used to control the device 430 by providing the prediction to an interested party (e.g., police, advertiser, etc.) via a display, website, social media account, a message from a server to a client, and/or one or more messages sent via text message or email. For example, the system can be configured to activate a device to generate and transmit an alert (e.g., via e-mail, text, etc.) to an interested part, such as to notify police, account admins, or other interested persons, via a display, website, social media account, a message from a server to a client, and/or one or more messages sent via text message or email to a recipient or interested part. As another example, controlling the device 430 can include generating GPS navigation coordinates of the large-scale event and transmitting the coordinates to the interested party (e.g., police, journalist, etc.) to direct the party to the location of the event.

As noted above, implementation of the During model 420 results in a prediction of the number of activists (e.g., by tallying when they are deemed activists 426) involved in the large-scale event online which can, in some embodiments, be used to estimate magnitude of the large-scale event in the real-world and a response to be implemented, whether governmental, policy related, or other appropriate response. The magnitude may be the total number of users or a percentage of a population of users that are predicted to be activists. For example, if the number of activists exceeds a predefined number (e.g., greater than x % of a population, such as greater than 10%, etc. of a population), the system can control the device 430 to implement actions that may be desirable by one or more parties given the large-scale event. As can be appreciated by those skilled in the art, there are a number of devices that can be controlled in a variety of different scenarios given a large-scale event. For example, the system can interface with cellular phone systems and through appropriate commands, cause the cellular phone systems to cease communication operations or otherwise stop cellular service (such as in it is a large-scale riot or coordinated protest). As yet another example, the system can control a cellular phone jamming network and cause the cellular phone jammers in the network to turn on and other wise interrupt the user of cellular phones.

Further, knowing if a particular person is an activist (i.e., element 426) for a particular large-scale event allows the system to implement a variety of possible procedures, including controlling the applicable device 430. For example and as noted above, the system can be used to cause a server to provide enhanced services, such as personalization and recommendations regarding a particular product or service based on products or services associated with the particular large-scale event. For example, if a particular agent is deemed an activist 426, the system can push advertisements to the agent's social media account with internet weblinks that correspond to a product or service. In this way, advertisements that may not otherwise be directed to a particular social media account could be delivered to that particular social media account based on the user's activities as an activist.

Figure 8:
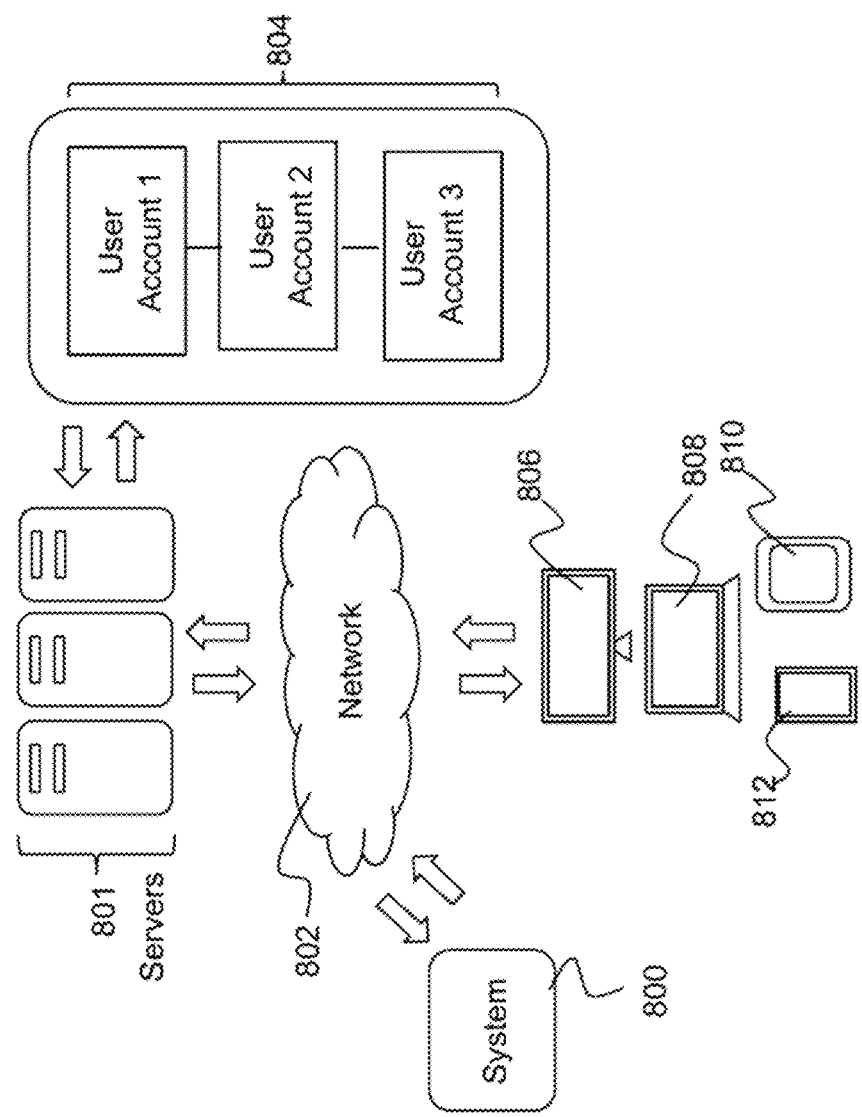
FIG. 8 is an illustration of hardware communications in the device characterization system according to some embodiments of the present disclosure.

As another example of operating or controlling a device 430, the system could use a display, or transmit information via a network card or wireless receiver or network, or transmit information regarding the large-scale event using any other suitable mechanism or technique as understood by those skilled in the art. As another example, the device operation includes outputting predicted large-scale events via at least one of a display and a network transmission As shown in FIG. 8, the system 800 according to embodiments of the present disclosure connects with servers 801 for social network platforms to access information or automatically provide targeted advertisements to a display screen on a communication device (elements, 806, 808, 810, 810) via a social network account (element 804). The system 800 connects via a network 802 to servers 801 to send and receive information relating to various social media network of interconnected user accounts (element 804) that are accessed via mobile and non-mobile devices, non-limiting examples of which include desktops 806, laptops 808, iPhone 810, and Android mobile device 812. Non-limiting examples of user accounts (element 804) include Facebook® user accounts and Twitter® user accounts. As can be appreciated by one skilled in the art, the user device is any device that can receive and transmit data via the network 802. Additionally, a user account may be a user account of a social media platform, which may or may not be capable of receiving targeted marketing.

Thus, as can be appreciated by those skilled in the art, a number of operations and/or actions can be initiated based on identifying a particular "activist" and/or identifying a magnitude (e.g., total number or percent of users, etc.) of a large-scale event.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for event prediction and associated response, the system comprising:
one or more processors and a memory, the memory being a non-transitory computer-readable medium having executable instructions encoded thereon, such that upon execution of the instructions, the one or more processors perform operations of:
using an agent-based model having a plurality of agents and associated agent accounts, predicting how many agent accounts on a social media platform will become activists related to an event by performing operations of:
generating, based on posts on the social media platform before the event, agent attributes and a posting network;
determining, during the event, if a non-activist social media agent account will become an activist of the event based on at least the agent attributes, the posting network, observed counts of event-related memes during the event, and a percentage of memes in the non-activist social media agent's memory that are associated with the event;
controlling a device based on prediction of the activists related to the event by performing an operation selected from a group consisting of: (1) generating global positioning system (GPS) coordinates of a location of the event and transmitting the GPS coordinates to an interested party to direct the interested party to the location of the event, (2) causing a telecommunication system to execute a telecommunication level of service change to alter at least the activists' telecommunication services; and (3) pushing advertisements to the activists' accounts on the social media platform with internet weblinks regarding a product or service based on products or services associated with the event.

2. The system as set forth in claim 1, wherein agents within the posting network having memories and neighbors, and wherein generating agent attributes and a posting network further comprises operations of:
loading random memes into agents' memories, the agents being within a re-blog network from the social media platform;
selecting an agent from the re-blog network to post with a probability proportional to the agent's out-degree within the re-blog network;
determining if the agent posts a novel meme with a probability Pn or a set of memes from the agent's memory, such that if the agent is posting a novel meme, the novel meme is added to the agent's memory and if the agent is posting from the agent's memory, each meme in the agent's memory is added to the post with probability Pr; and
after every post, updating the agent's memory and memories of the agent's neighbors with the posted memes, thereby generating the agent attributes and corresponding posting network.

3. The system as set forth in claim 2, wherein determining if a social media agent account will become an activist of the event further comprises operations of:
randomly selecting a number of agents from the posting network;
adding to the agents' memories memes associated with the large-scale event with frequencies proportional to the observed counts on a first day of the event;
selecting an agent from the posting network with a probability proportional to the agent's out-degree within the posting network;
determining if the agent posts a meme from memory based on the probability Pn being less than a randomly selected number; and
if the agent is posting from the agent's memory, designating the agent as an activist if a percentage of memes in the agent's memory associated with the event is greater than a predetermined proportion of event memes in the agent's memory Pm.

4. The system as set forth in claim 1, wherein generating, based on posts on the social media platform before the event, agent attributes and a posting network, includes performing operations of:
  randomly selecting a number of agents from the posting network;
  adding to the agents' memories memes associated with the large-scale event with frequencies proportional to the observed counts on a first day of the event;
  selecting an agent from the posting network with a probability proportional to the agent's out-degree within the posting network;
  determining if the agent posts a meme from memory based on the probability Pn being less than a randomly selected number; and
  if the agent is posting from the agent's memory, designating the agent as an activist if a percentage of memes in the agent's memory associated with the event is greater than a predetermined proportion of event memes in the agent's memory Pm.

5. The system as set forth in claim 1, further comprising an operation of estimating a magnitude of the event.

6. The system as set forth in claim 5, wherein the device is activated when the magnitude exceeds a predetermined threshold.

7. The system as set forth in claim 1, wherein controlling the device includes causing relevant data to be transmitted to an interested party.

8. A method for event prediction and associated response, the method comprising acts of:
  using an agent-based model having a plurality of agents and associated agent accounts, predicting how many agent accounts on a social media platform will become activists related to an event by performing operations of:
    generating, based on posts on the social media platform before the event, agent attributes and a posting network;
    determining, during the event, if a non-activist social media agent account will become an activist of the event based on at least the agent attributes, the posting network, observed counts of event-related memes during the event, and a percentage of memes in the non-activist social media agent's memory that are associated with the event; and
  controlling a device based on prediction of the activists related to the event by performing an operation selected from a group consisting of: (1) generating global positioning system (GPS) coordinates of a location of the event and transmitting the GPS coordinates to an interested party to direct the interested party to the location of the event, (2) causing a telecommunication system to execute a telecommunication level of service change to alter at least the activists' telecommunication services; and (3) pushing advertisements to the activists' accounts on the social media platform with internet weblinks regarding a product or service based on products or services associated with the event.

9. The method as set forth in claim 8, wherein agents within the posting network having memories and neighbors, and wherein generating agent attributes and a posting network further comprises operations of:
  loading random memes into agents' memories, the agents being within a re-blog network from the social media platform;
  selecting an agent from the re-blog network to post with a probability proportional to the agent's out-degree within the re-blog network;
  determining if the agent posts a novel meme with a probability Pn or a set of memes from the agent's memory, such that if the agent is posting a novel meme, the novel meme is added to the agent's memory and if the agent is posting from the agent's memory, each meme in the agent's memory is added to the post with probability Pr; and
  after every post, updating the agent's memory and memories of the agent's neighbors with the posted memes, thereby generating the agent attributes and corresponding posting network.

10. The method as set forth in claim 9, wherein determining if a social media agent account will become an activist of the event further comprises acts of:
  randomly selecting a number of agents from the posting network;
  adding to the agents' memories memes associated with the large-scale event with frequencies proportional to the observed counts on a first day of the event;
  selecting an agent from the posting network with a probability proportional to the agent's out-degree within the posting network;
  determining if the agent posts a meme from memory based on the probability Pn being less than a randomly selected number; and
  if the agent is posting from the agent's memory, designating the agent as an activist if a percentage of memes in the agent's memory associated with the event is greater than a predetermined proportion of event memes in the agent's memory Pm.

11. The method as set forth in claim 8, wherein generating, based on posts on the social media platform before the event, agent attributes and a posting network, includes performing acts of:
  randomly selecting a number of agents from the posting network;
  adding to the agents' memories memes associated with the large-scale event with frequencies proportional to the observed counts on a first day of the event;
  selecting an agent from the posting network with a probability proportional to the agent's out-degree within the posting network;
  determining if the agent posts a meme from memory based on the probability Pn being less than a randomly selected number; and
  if the agent is posting from the agent's memory, designating the agent as an activist if a percentage of memes in the agent's memory associated with the event is greater than a predetermined proportion of event memes in the agent's memory Pm.

12. The method as set forth in claim 8, further comprising an act of estimating a magnitude of the event.

13. The method as set forth in claim 12, wherein the device is activated when the magnitude exceeds a predetermined threshold.

14. The method as set forth in claim 8, wherein controlling the device includes causing relevant data to be transmitted to an interested party.

15. A computer program product for event prediction and associated response, the computer program product comprising:
  a non-transitory computer-readable medium having executable instructions encoded thereon, such that upon execution of the instructions by one or more processors, the one or more processors perform operations of:
using an agent-based model having a plurality of agents and associated agent accounts, predicting how many agent accounts on a social media platform will become activists related to an event by performing operations of:
generating, based on posts on the social media platform before the event, agent attributes and a posting network;
determining, during the event, if a non-activist social media agent account will become an activist of the event based on at least the agent attributes, the posting network, observed counts of event-related memes during the event, and a percentage of memes in the non-activist social media agent's memory that are associated with the event; and
controlling a device based on prediction of the activists related to the event by performing an operation selected from a group consisting of: (1) generating global positioning system (GPS) coordinates of a location of the event and transmitting the GPS coordinates to an interested party to direct the interested party to the location of the event, (2) causing a telecommunication system to execute a telecommunication level of service change to alter at least the activists' telecommunication services; and (3) pushing advertisements to the activists' accounts on the social media platform with internet weblinks regarding a product or service based on products or services associated with the event.

16. The computer program product as set forth in claim 15, wherein agents within the posting network having memories and neighbors, and wherein generating agent attributes and a posting network further comprises operations of:
loading random memes into agents' memories, the agents being within a re-blog network from the social media platform;
selecting an agent from the re-blog network to post with a probability proportional to the agent's out-degree within the re-blog network;
determining if the agent posts a novel meme with a probability Pn or a set of memes from the agent's memory, such that if the agent is posting a novel meme, the novel meme is added to the agent's memory and if the agent is posting from the agent's memory, each meme in the agent's memory is added to the post with probability Pr; and
after every post, updating the agent's memory and memories of the agent's neighbors with the posted memes, thereby generating the agent attributes and corresponding posting network.

17. The computer program product as set forth in claim 16, wherein determining if a social media agent account will become an activist of the event further comprises operations of:
randomly selecting a number of agents from the posting network;
adding to the agents' memories memes associated with the large-scale event with frequencies proportional to the observed counts on a first day of the event;
selecting an agent from the posting network with a probability proportional to the agent's out-degree within the posting network;
determining if the agent posts a meme from memory based on the probability Pn being less than a randomly selected number; and
if the agent is posting from the agent's memory, designating the agent as an activist if a percentage of memes in the agent's memory associated with the event is greater than a predetermined proportion of event memes in the agent's memory Pm.

18. The computer program product as set forth in claim 15, wherein generating, based on posts on the social media platform before the event, agent attributes and a posting network, includes performing operations of:
randomly selecting a number of agents from the posting network;
adding to the agents' memories memes associated with the large-scale event with frequencies proportional to the observed counts on a first day of the event;
selecting an agent from the posting network with a probability proportional to the agent's out-degree within the posting network;
determining if the agent posts a meme from memory based on the probability Pn being less than a randomly selected number; and
if the agent is posting from the agent's memory, designating the agent as an activist if a percentage of memes in the agent's memory associated with the event is greater than a predetermined proportion of event memes in the agent's memory Pm.

19. The computer program product as set forth in claim 15, further comprising an operation of estimating a magnitude of the event.

20. The computer program product as set forth in claim 19, wherein the device is activated when the magnitude exceeds a predetermined threshold.

21. The computer program product as set forth in claim 15, wherein controlling the device includes causing relevant data to be transmitted to an interested party.

* * * * *